United States Patent
Su et al.

(10) Patent No.: US 12,444,116 B2
(45) Date of Patent: Oct. 14, 2025

(54) METHOD FOR GENERATING STOP-MOTION ANIMATION, COMPUTER READABLE STORAGE MEDIUM, AND COMPUTER DEVICE

(71) Applicant: ARASHI VISION INC., Shenzhen (CN)

(72) Inventors: Tan Su, Shenzhen (CN); Peiyang Jia, Shenzhen (CN); Fei Gao, Hongkong (CN)

(73) Assignee: ARASHI VISION INC., Shenzhen (CN)

( * ) Notice: Subject to any disclaimer, the term of this patent is extended or adjusted under 35 U.S.C. 154(b) by 0 days.

(21) Appl. No.: 18/034,503

(22) PCT Filed: Nov. 2, 2021

(86) PCT No.: PCT/CN2021/128254
§ 371 (c)(1),
(2) Date: Apr. 28, 2023

(87) PCT Pub. No.: WO2022/095859
PCT Pub. Date: May 12, 2022

(65) Prior Publication Data
US 2024/0346738 A1    Oct. 17, 2024

(30) Foreign Application Priority Data
Nov. 3, 2020   (CN) .......................... 202011210963.6

(51) Int. Cl.
*G06T 13/80*    (2011.01)
*G06T 5/10*    (2006.01)
(Continued)

(52) U.S. Cl.
CPC ................ *G06T 13/80* (2013.01); *G06T 5/10* (2013.01); *G06T 7/246* (2017.01); *G06T 7/70* (2017.01); *G06T 2207/20056* (2013.01)

(58) Field of Classification Search
CPC .......... G06T 13/80; G06T 7/246; G06T 7/70; G06T 5/10; G06T 2207/20056
See application file for complete search history.

(56) References Cited

U.S. PATENT DOCUMENTS 5,519,826 A  *  5/1996  Harper .................. G03B 15/08
                                                      345/473
10,038,858 B1 *  7/2018  Anderson .............. H04N 23/60
(Continued)

FOREIGN PATENT DOCUMENTS

CN           104036536 A  *  9/2014

OTHER PUBLICATIONS

Zheng, Xiaoguang Han Hongbo Fu Hanlin, and Ligang Liu Jue Wang. "A Video-based Interface for Hand-Driven Stop Motion Animation Production." IEEE Computer Graphics and Applications 3.10.1109 (2013). (Year: 2013).*

(Continued)

*Primary Examiner* — Yu Chen
(74) *Attorney, Agent, or Firm* — XSENSUS LLP

(57) ABSTRACT

A method and an apparatus for generating a stop-motion animation, a computer readable storage medium, and a computer device. The method comprises: acquiring a video containing a periodic motion of a target, the video containing a preset number of continuous motion periods (S101); determining an initial motion period of the target in the video by using a posture estimation algorithm (S102); determining a start period node according to the initial motion period, determining subsequent period nodes according to the start period node, and for the preset number of (Continued)

continuous motion periods, respectively extracting, in each motion period, a video frame corresponding to the same posture, or respectively extracting, in each motion period, a video frame corresponding to a different posture in a sequential order or reversed sequential order of motion, so as to obtain a video frame sequence of the stop-motion animation (S103); and generating a stop-motion animation video according to the video frame sequence of the stop-motion animation (S104). The method is simple in operation, and performs frame extraction automatically using an algorithm, without the need of selecting video frames manually, greatly improving the efficiency of generating a stop-motion animation and having high robustness.

16 Claims, 4 Drawing Sheets

(51) Int. Cl.
*G06T 7/246* (2017.01)
*G06T 7/70* (2017.01)

(56) References Cited

U.S. PATENT DOCUMENTS

| | | | | |
|---|---|---|---|---|
| 12,033,257 | B1* | 7/2024 | Baron | H04R 3/005 |
| 2005/0231513 | A1* | 10/2005 | LeBarton | G09B 19/00 |
| | | | | 345/473 |
| 2007/0285560 | A1* | 12/2007 | Perlman | H04N 23/74 |
| | | | | 348/371 |
| 2020/0036952 | A1* | 1/2020 | Iwane | G06T 13/80 |
| 2022/0189094 | A1* | 6/2022 | Zhang | G06V 40/23 |
| 2022/0198732 | A1* | 6/2022 | Lin | G06V 20/46 |

OTHER PUBLICATIONS

Anonymous:"stroboscopic effect—wikipedia Jul. 19, 2020 ( Jul. 19, 2020 ) XP093143188".
Claire Chambers et al: "Pose estimates from online videos show that side by side walkers synchronize movement under naturalistic conditions" Plos One vol. 14, No. 6, Jun. 6, 2019, pp. 1-17 XP055769257.
Communication pursuant to Article 94(3) EPC mailed Jul. 30, 2025, in European Application No. 21888556.4, 7 pages.

* cited by examiner

METHOD FOR GENERATING STOP-MOTION ANIMATION, COMPUTER READABLE STORAGE MEDIUM, AND COMPUTER DEVICE

TECHNICAL FIELD OF THE INVENTION

The present application relates to the field of video processing, and in particular, relates to a method and an apparatus for generating a stop-motion animation, a computer readable storage medium, and a computer device.

BACKGROUND OF THE INVENTION

A method for generating a stop-motion animation in the prior art includes the following steps: acquiring at least a part of video data frames in a target video; extracting a plurality of video data frames at intervals from the at least a part of video data frames that are acquired, wherein the difference of time values of the extracted different video data frames in the target video is greater than a preset minimum time interval; connecting the extracted plurality of video data frames in time sequence to generate a stop-motion animation.

However, the frame extraction operation of the method for generating a stop-motion animation in the prior art is mainly implemented by timed frame extraction or manual frame extraction, the timed frame extraction is not intelligent enough, while the manual frame extraction is labor consuming and inefficient.

SUMMARY OF THE INVENTION

Embodiments of the present application aim to provide a method and an apparatus for generating a stop-motion animation, a computer readable storage medium, and a computer device so as to solve one of the above problems.

In a first aspect, the present application provides a method for generating a stop-motion animation, which includes the following steps:
S101: acquiring a video containing a periodic motion of a target, the video containing a preset number of continuous motion periods;
S102: determining an initial motion period of the target in the video by using a posture estimation algorithm;
S103: determining a start period node according to the initial motion period, determining subsequent period nodes according to the start period node, and for the preset number of continuous motion periods, respectively extracting, in each motion period, a video frame corresponding to the same posture, or respectively extracting, in each motion period, a video frame corresponding to a different posture in a sequential order or reversed sequential order of motion, so as to obtain a video frame sequence of the stop-motion animation;
S104: generating a stop-motion animation video according to the video frame sequence of the stop-motion animation.

In a second aspect, the present application provides an apparatus for generating a stop-motion animation, the apparatus includes:
an acquisition module, being configured to acquire a video containing a periodic motion of a target, the video containing a preset number of continuous motion periods;
a determining module, being configured to determine an initial motion period of the target in the video by using a posture estimation algorithm;
an extraction module, being configured to determine a start period node according to the initial motion period, determine subsequent period nodes according to the start period node, and for the preset number of continuous motion periods, respectively extract, in each motion period, a video frame corresponding to the same posture, or respectively extract, in each motion period, a video frame corresponding to a different posture in a sequential order or reversed sequential order of motion, so as to obtain a video frame sequence of the stop-motion animation;
a generating module, being configured to generate a stop-motion animation video according to the video frame sequence of the stop-motion animation.

In a third aspect, the present application provides a computer readable storage medium storing a computer program, the computer program, when executed by a processor, implements the steps of the method for generating a stop-motion animation as described above.

In a fourth aspect, the present application provides a computer device, which includes:
one or more processors;
a memory; and
one or more computer programs, the processors and the memory are connected through a bus, wherein the one or more computer programs are stored in the memory and are configured to be executed by the one or more processors, the processor, when executing the computer programs, implements the steps of the method for generating a stop-motion animation as described above.

In the embodiment of the present application, an initial motion period of the target in the video is determined by using a posture estimation algorithm, a start period node is determined according to the initial motion period, subsequent period nodes are determined according to the start period node, and for the preset number of continuous motion periods, a video frame corresponding to the same posture is respectively extracted in each motion period, or a video frame corresponding to a different posture is respectively extracted in each motion period in a sequential order or reversed sequential order of motion, so as to obtain a video frame sequence of the stop-motion animation; and a stop-motion animation video is generated according to the video frame sequence of the stop-motion animation. Therefore, the method is simple in operation, and performs frame extraction automatically using an algorithm, without the need of selecting video frames manually, thereby greatly improving the efficiency of generating a stop-motion animation and having high robustness.

DETAILED DESCRIPTION OF THE INVENTION

In order to make objectives, technical solutions and beneficial effects of the present application clearer, the present application will be further explained in detail in combination with attached drawings and embodiments. It shall be appreciated that, the specific embodiments described herein are only used to explain the present application and are not intended to limit the present application.

In order to explain the technical solution described in the present application, the following description will be made through specific embodiments.

Figure 1:
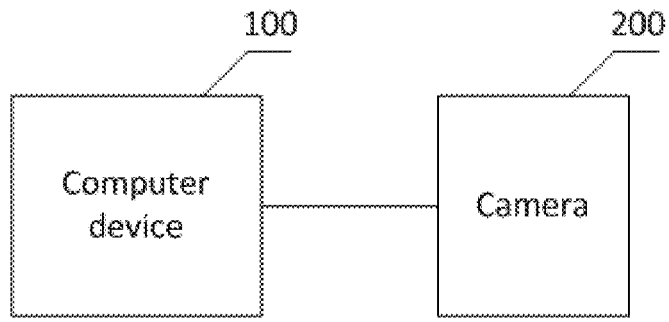
FIG. 1 is a schematic view of an application scenario of a method for generating a stop-motion animation according to an embodiment of the present application.

The application scenario of a method for generating a stop-motion animation provided according to an embodiment of the present application may be a computer device, and the computer device executes the method for generating a stop-motion animation provided by an embodiment of the present application to generate the stop-motion animation. The application scenario of the method for generating a stop-motion animation according to an embodiment of the present application may also include a computer device 100 and a camera 200 connected with each other (as shown in FIG. 1). The computer device 100 and the camera 200 can run at least one application program therein. The computer device 100 may be a server, a desktop computer, a mobile terminal or the like, the mobile terminal includes a mobile phone, a tablet computer, a notebook computer, a personal digital assistant or the like. The camera 200 may be an ordinary camera or a panorama camera or the like. The ordinary camera refers to a shooting device used to shoot plane images and plane videos. The computer device 100 or the camera 200 executes the method for generating a stop-motion animation provided according to an embodiment of the present application to generate the stop-motion animation.

Figure 2:
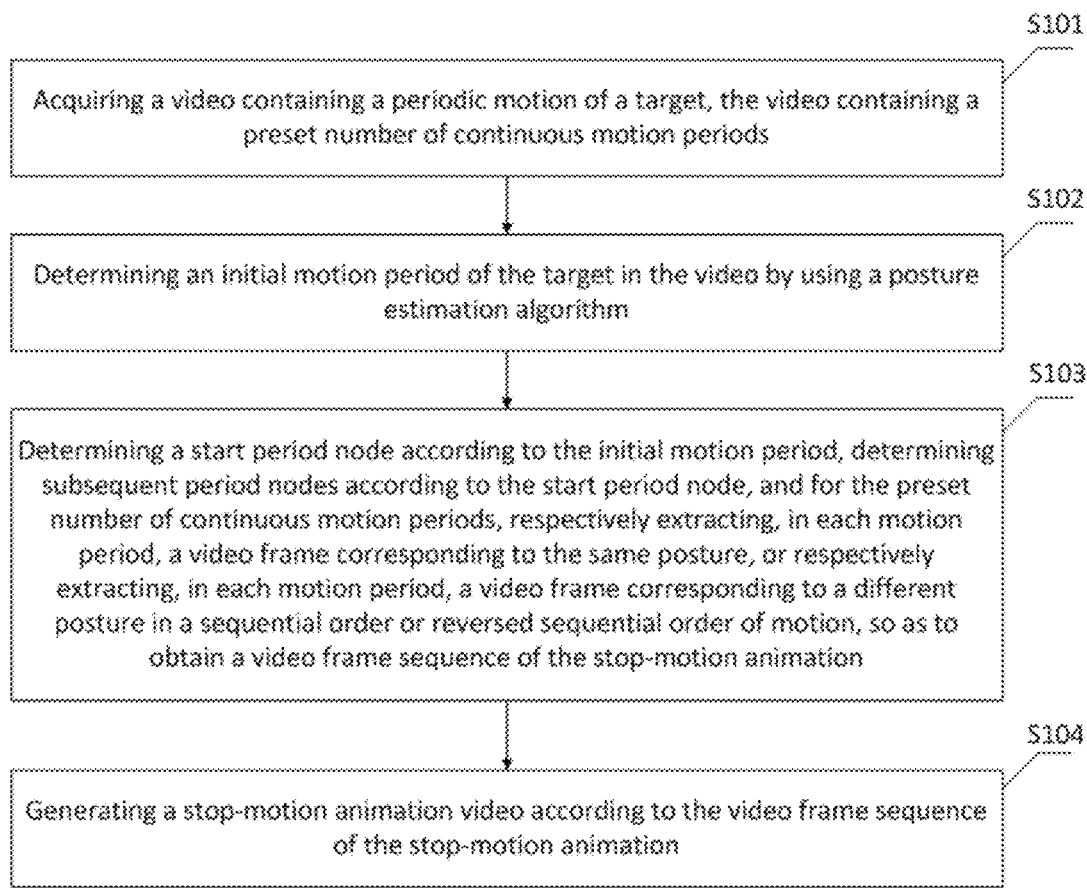
FIG. 2 is a flowchart diagram of a method for generating a stop-motion animation according to an embodiment of the present application.

Please refer to FIG. 2, which is a flowchart diagram of a method for generating a stop-motion animation according to an embodiment of the present application, this embodiment mainly takes a case where the method for generating a stop-motion animation is applied to a computer device as an example for illustration, and the method for generating a stop-motion animation provided according to an embodiment of the present application includes the following steps.

S101: acquiring a video containing a periodic motion of a target, the video containing a preset number of continuous motion periods.

In an embodiment of the present application, the video is shot from a fixed perspective.

The fixed perspective may be any angle substantially remaining unchanged among 360 degrees, for example, an angle for fixedly shooting the side of a periodically moving target.

The target may be all objects that can move periodically, such as humans, animals and vehicles.

The number of motion periods included in the video is greater than a preset period threshold, for example, the preset period threshold is greater than or equal to 20 periods.

The periodic motion of the target in the video is uninterrupted.

The video may be a plane video or a panoramic video, the panoramic video may be shot by a panorama camera, or it may be spliced by plane videos shot by a plurality of ordinary cameras.

Figure 3:
FIG. 3 is a schematic view of a target before perspective transformation.
Figure 4:
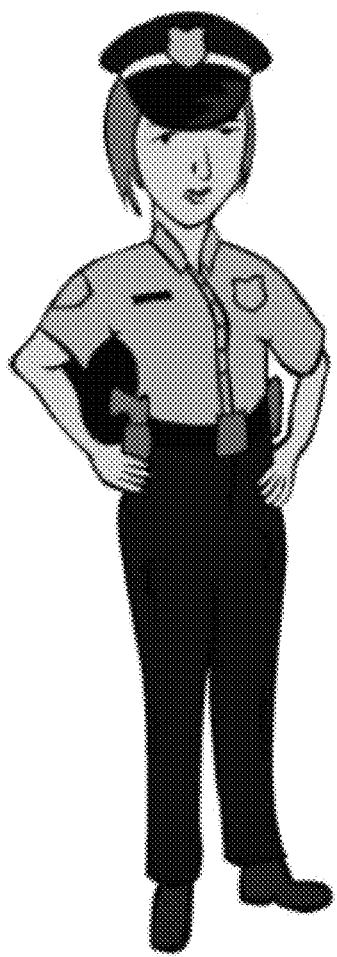
FIG. 4 is a schematic view of the target after perspective transformation.

In an embodiment of the present application, after S101, the method may further include the following steps:

S1012. identifying and tracking the target from a start point by adopting a target identification and tracking algorithm (including but not limited to the classical identification and tracking algorithm), and performing perspective transformation operation on the target in the video frame to keep the target in the same position in each video frame, and/or keep the target in the same size in each video frame. As shown in FIG. 3, the target in the video frame is narrowed or tilted in the picture, and as shown in FIG. 4, the target in the video frame is enlarged or straightened after perspective transformation, so that the target keeps roughly the same position and/or the same size in the picture in each video frame.

In an embodiment of the present application, after S101 or before S1012, the method may further include the following steps.

manually or automatically selecting one video frame after the target starts the periodic motion in the video as the start point for performing S102 or S1012.

S102. determining an initial motion period of the target in the video by using a posture estimation algorithm.

In an embodiment of the present application, S102 may specifically include the following steps:

S1021. extracting a preset number of continuous video frames from the video.

S1022. for the preset number of continuous video frames, identifying key points of the target periodically moving in each of the video frames by using the target identification and tracking algorithm, and each of the key points is represented by coordinate values.

The preset number of continuous video frames may be N (N is any value such as 300, 500) frames of continuous video frames starting from the video.

For example, key points such as head, left and right shoulders, left and right elbows, left and right hands, left and right hips, left and right knees, left and right feet of a person moving periodically are identified by using the posture estimation algorithm, and each key point is represented by coordinate values.

S1023. according to the key points of the target in the preset number of continuous video frames, calculating an observation value V(i) of two preset key points in each of the video frames to obtain an observation value sequence of the video, wherein the observation value is the distance between the two preset key points of the target in the video frame.

The periodic motion may be mapped to the periodic change rule of the coordinate values of a certain key point of the target; for example, taking the case where walking is shot from a side as an example, the distance between the left and right feet will change periodically with the movement of both feet when a person is walking; therefore, the distance between two feet in the picture may be used as the observation value, and if the coordinate values of the left foot in the key points of the ith video frame are $p_l(i)_x$ and $p_l(i)_y$, and the coordinate values of the right foot in the key points are $p_r(i)_x$ and $p_r(i)_y$, then the periodic index of the ith video frame is $V(i)=\sqrt{(p_l(i)_x-p_r(i)_x)^2+(p_l(i)_y-p_r(i)_y)^2}$, and in a walking period, the index of the distance between two feet undergoes two periodic processes of increasing and decreasing, that is, the actual walking period is two times of the change period of the observation index, so the period node of walking is determined to be two times of the change period of the observation index.

S1024. performing discrete Fourier transform on the observation value sequence to find the frequency F with the largest response, then the period of an initial observation value is N/F, wherein N is the number of the preset number of continuous video frames.

S1025. obtaining an initial motion period M(0) according to the period of the initial observation value.

For the scene where a person or an animal walking is shot at one side, when the distance between two feet is taken as the observation value, the initial motion period is M(0)=(N/F*2), and for the movement of vehicles or other targets, the initial motion period is M(0)=N/F.

S103. determining a start period node according to the initial motion period, determining subsequent period nodes according to the start period node, and for the preset number of continuous motion periods, respectively extracting, in each motion period, a video frame corresponding to the same posture, or respectively extracting, in each motion period, a video frame corresponding to a different posture in a sequential order or reversed sequential order of motion, so as to obtain a video frame sequence of the stop-motion animation.

A typical use scenario is that a camera takes pictures of a person walking from the side of the person for more than half a minute. Because the action of walking is periodic, and the alternating of the left and right feet for one time constitutes one period, the same posture will appear repeatedly in different periods. For example, the posture with the farthest distance between the two feet when the left foot is at the back and the right foot is at the front will appear repeatedly in the whole walking process, and it will appear once in each period with the same frequency and pace frequency.

If video frames corresponding to the same posture are respectively extracted in each motion period, then all these video frames corresponding to the same posture may be connected to form a new frame sequence, which looks like a person sliding/fluttering on the road while keeping this posture.

If video frames corresponding to a different posture are extracted in a sequential order or reversed sequential order of motion in each motion period, then the video frames selected in such a manner still seem to have the original action when connected, but the background changes at a faster speed.

The posture in a motion period is divided into m postures, m is a natural number greater than or equal to 2, and the xth posture is at the position $x \in [0,m]$ in the whole motion period; $\beta = x/m$ represents the position of the expected output posture in the whole motion period; for example, the postures in one motion period may be divided into 10 postures in the order of appearance, and if you want to output all the video frames of the fifth posture, then $\beta = 5/10 = 0.5$.

For the preset number of continuous motion periods, a video frame corresponding to the same posture is respectively extracted in each motion period, or a video frame corresponding to a different posture is respectively extracted in each motion period in a sequential order or reversed sequential order of motion, so as to obtain a video frame sequence of the stop-motion animation.

In an embodiment of the present application, the operation of for the preset number of continuous motion periods, respectively extracting, in each motion period, a video frame corresponding to the same posture so as to obtain a video frame sequence of the stop-motion animation may specifically include the following steps:

S10311. among the video frames from the beginning of a first initial motion period to the end of a second initial motion period, selecting the video frame with the largest observed value to serve as a start video frame k(0) of the initial motion period and as the start motion period node k(0); the video frames from the beginning of the first initial motion period to the end of the second initial motion period may specifically be the video frames between the 1/2 th initial motion period M(0) and the 3/2th initial motion period M(0).

Because it is a periodic motion and the length of adjacent motion periods (which may be expressed by the number of video frames) is relatively close, after obtaining the initial motion period M(0), we can know the approximate position where the next period node appears, i.e., the position near the M(0)th frame after the previous period node. Therefore, the video frame with the largest observation value is searched out near the M(0)th frame to serve as the next period node, and the length of the motion period is updated.

Generally speaking, it is only necessary to select the video frame with the largest observation value in a certain range and ensure that the observation value of this frame is the local maximum. Because the video has just started in the 0th video frame, the periodicity of the motion of the target in the picture is still unstable in many cases, so the best value in a complete motion period after a period of time is selected as the first period node. Therefore, among the video frames from the beginning of the first initial motion period to the end of the second initial motion period, the video frame with the largest observation value is selected as the start video frame k(0) of the initial motion period. In fact, the video has just started from the 0th video frame to the 0.5*M(0)th video frame, and the periodicity of the motion of the target in the picture is still unstable in many cases; in order to reduce the computational burden, we can choose the video frame with the largest observation value from the video frames between the 1/2th initial motion period M(0) and the 3/2th initial motion period M(0) to serve as the start video frame k(0) of the initial motion period.

S10312. outputting a first frame of the video frame sequence of the stop-motion animation as $k(0)+\beta*M(0)$ according to the start video frame k(0), wherein $\beta$ is the position of an expected output posture among all postures in the whole initial motion period M(0), the value of $\beta$ is in the interval of [0,1], 0 represents a first posture in the whole motion period, and 1 represents the last posture in the whole motion period.

S10313. among the video frames within the range of two continuous initial motion periods after the previous period node k(i−1), selecting the video frame with the largest observed value as the next motion period node k(i), wherein i is a positive integer; the video frames within the range of two continuous initial motion periods may be specifically video frames between the 3/4 th initial motion period M(0) to the 5/4th initial motion period M(0).

Because the length of the next motion period is updated after knowing the previous period node k(i−1), and the length of the next motion period should be close to that of the previous motion period, the next period node should appear in the range from k(i−1)+3/4*M(0) to k(i−1)+5/4*M(0). That is, assuming that the length of the motion period is constant, the period node after one motion period is in the range of half a motion period.

S10314. calculating the ith motion period M(i) according to the next period node k(i).

S10314 may be specifically the ith motion period M(i)=k(i)−k(i−1).

In order to make the adjacent motion periods change less violently, S10314 may also specifically be: the ith motion period M(i)=M(i)'*x+M(i−1)*(1−x), wherein M(i)'=k(i)'−k(i−1), k(i)'=k(i), 1>x>0, and x represents the speed of change of the length for two adjacent motion periods, e.g., x=0.5, M(i)=M(i)'*0.5+M(i−1)*0.5; The M(i) calculated by above method will change relatively gently, but not drastically, which is more in line with the characteristics of periodic motion; according to the ith motion period M(i) obtained, the next period node is recalculated as k(i)=k(i−1)+M(i). Thus, the next period node k(i) that is more accurate can be obtained.

S10315. selecting and outputting the k(i)+β*M(i)th frame to the video frame sequence of the stop-motion animation.

In an embodiment of the present application, the operation of for the preset number of continuous motion periods, respectively extracting, in each motion period, a video frame corresponding to a different posture in a sequential order or reversed sequential order of motion so as to obtain a video frame sequence of the stop-motion animation may specifically include the following steps:

S10321. among the video frames from the beginning of the first initial motion period to the end of the second initial motion period, selecting the video frame with the largest observation value to serve as the start video frame k(0) of the initial motion period and as the start period node k(0); the video frames from the beginning of the first initial motion period to the end of the second initial motion period may specifically be the video frames from the 1/2 th initial motion period M(0) to the 3/2th initial motion period M(0).

S10322. outputting the first frame of the video frame sequence of the stop-motion animation as k(0)+β(0)*M(0) according to the start video frame k(0), wherein β(0) is the position of an initial output posture among all the postures in the whole initial motion period M(0), the value of β(0) is in the interval of [0,1], 0 represents the first posture in the whole motion period, and 1 represents the last posture in the whole motion period.

S10323. among the video frames within the range of two continuous initial motion periods after the previous period node k(i−1), selecting the video frame with the largest observation value as the next motion period node k(i), wherein i is a positive integer; the video frames within the range of two continuous initial motion periods may specifically be video frames between the 3/4 th initial motion period M(0) to the 5/4th initial motion period M(0).

S10324. calculating the ith motion period M(i) according to the next period node k(i).

S10324 may be specifically: the ith motion period M(i)=k(i)−k(i−1).

In order to make the adjacent motion periods change less violently, S10324 may also specifically be: the ith motion period M(i)=M(i)'*x+M(i−1)*(1−x), wherein M(i)'=k(i)'−k(i−1), k(i)'=k(i), 1>x>0 and x represents the speed of change of the length for two adjacent motion periods, e.g., x=0.5, M(i)=M(i)'*0.5+M(i−1)*0.5. The M(i) calculated by above method will change relatively gently, but not drastically, which is more in line with the characteristics of periodic motion; according to the ith motion period M(i) obtained, the next period node is recalculated as k(i)=k(i−1)+M(i). Thus, the next period node k(i) that is more accurate can be obtained.

S10325. selecting and outputting the k(i)+β(i)*M(i)th frame to the video frame sequence of the stop-motion animation, wherein when the periodic motion of the target is forward, β(i)=β(i−1)+1/M(i); if β(i)>1, then β(i)=β(i)−1, that is, when the last posture is output, it returns to the first posture in the motion period; when the periodic motion of the target is backward, then β(i)=β(i−1)−1/M(i); if β(i)<0, then β(i)=β(i)+1, that is, when the first posture is output, it returns to the last posture in the motion period.

S104. generating a stop-motion animation video according to the video frame sequence of the stop-motion animation.

In an embodiment of the present application, S104 may specifically include the following step:

according to the sequence in which the video frames occur in the video among the video frame sequence of the stop-motion animation, sorting the video frames according to a preset rule, and playing the video frames in turn to generate the stop-motion animation video.

The preset rules may follow a sequential order or a reversed sequential order, or other self-defined sorting methods.

In an embodiment of the present application, the difference of time values between adjacent video frames in the stop-motion animation video may be a fixed value or may change according to a preset rule; for example, the difference between time values may be preset to a fixed value of 0.5 seconds, or other variable values.

Figure 5:
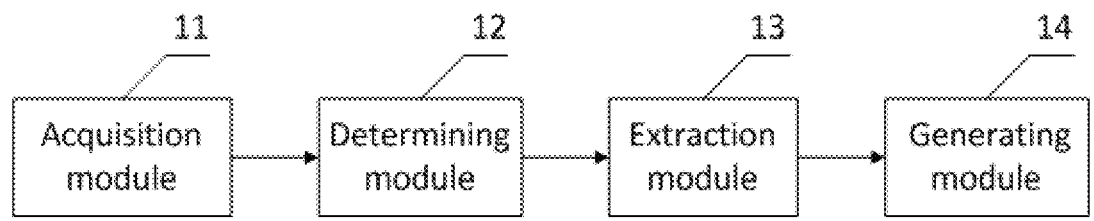
FIG. 5 is a schematic view of an apparatus for generating a stop-motion animation according to an embodiment of the present application.

Referring to FIG. 5, an apparatus for generating a stop-motion animation provided according to an embodiment of the present application may be a computer program or a piece of program code running in a computer device or a camera, for example, the apparatus for generating the stop-motion animation is an application software; the apparatus for generating the stop-motion animation may be used for executing the corresponding steps in the method for generating the stop-motion animation provided according to the embodiment of the present application. An apparatus for generating a stop-motion animation provided according to an embodiment of the present application includes:

an acquisition module 11, being configured to acquire a video containing a periodic motion of a target, the video containing a preset number of continuous motion periods;

a determining module 12, being configured to determine an initial motion period of the target in the video by using a posture estimation algorithm;

an extraction module 13, being configured to determine a start period node according to the initial motion period, determine subsequent period nodes according to the start period node, and for the preset number of continuous motion periods, respectively extract, in each motion period, a video frame corresponding to the same posture, or respectively extract, in each motion period, a video frame corresponding to a different posture in a sequential order or reversed sequential order of motion, so as to obtain a video frame sequence of the stop-motion animation;

a generating module 14, being configured to generate a stop-motion animation video according to the video frame sequence of the stop-motion animation.

The apparatus for generating a stop-motion animation provided according to an embodiment of the present application belong to the same concept as the method for generating a stop-motion animation provided according to an embodiment of the present application, and reference may be made to the full text of the specification for the specific implementation process of the apparatus, and this will not be further described herein.

An embodiment of the present application further provides a computer readable storage medium storing a computer program, the computer program, when executed by a processor, implements the steps of the method for generating a stop-motion animation provided according to an embodiment of the present application.

Figure 6:
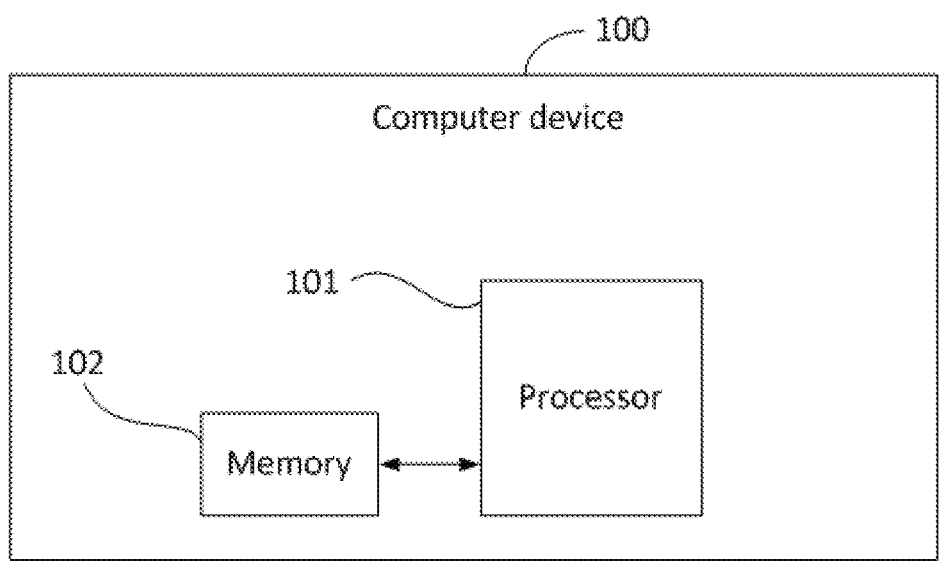
FIG. 6 is a block diagram illustrating the specific structure of a computer device according to an embodiment of the present application.

FIG. 6 is a block diagram illustrating the specific structure of a computer device provided according to an embodiment of the present application, the computer device may be the computer device shown in FIG. 1, a computer device 100 includes one or more processors 101, a memory 102, and one or more computer programs, wherein the processors 101 and the memory 102 are connected through a bus, and the one or more computer programs are stored in the memory 102 and are configured to be executed by the one or more processors 101, and the processors 101, when executing the computer program, implement the steps of the method for generating a stop-motion animation provided according to an embodiment of the present application.

The computer device may be one of servers, desktop computers, mobile terminals or the like, and the mobile terminals include mobile phones, tablet computers, notebook computers, personal digital assistants or the like.

In the embodiment of the present application, an initial motion period of the target in the video is determined by using a posture estimation algorithm; a start period node is determined according to the initial motion period, subsequent period nodes are determined according to the start period node, and for the preset number of continuous motion periods, a video frame corresponding to the same posture is respectively extracted in each motion period, or a video frame corresponding to a different posture is respectively extracted in different motion periods in a sequential order or reversed sequential order of motion, so as to obtain a video frame sequence of the stop-motion animation; and a stop-motion animation video is generated according to the video frame sequence of the stop-motion animation. Therefore, the method is simple in operation, and performs frame extraction automatically using an algorithm, without the need of selecting video frames manually, thereby greatly improving the efficiency of generating a stop-motion animation and having high robustness.

It shall be appreciated that, each of the steps in respective embodiments of the present application is not necessarily executed in the order indicated by the step numbers. Unless explicitly stated herein, the execution of these steps is not strictly limited in order, and these steps may be executed in other orders. Moreover, at least a part of the steps in respective embodiments may include multiple sub-steps or multiple stages, the sub-steps or stages are not necessarily completed at the same time, but may be executed at different times, and these sub-steps or stages is not necessarily executed sequentially, but may be executed in turn or alternately with other steps or at least a part of sub-steps or stages of other steps.

As shall be appreciated by those of ordinary skill in the art, the implementation of all or part of the processes in the method of the above-mentioned embodiments may be completed by instructing related hardware through a computer program, the computer program may be stored in a nonvolatile computer readable storage medium, and the program, when executed, may include the processes of the embodiments of the methods as described above. Any reference to memory, storage, database or other media used in the embodiments provided according to the present application may include non-volatile and/or volatile memory. The nonvolatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache memory. By way of illustration and not limitation, RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a memory bus (Rambus) direct RAM (RDRAM), a direct memory bus dynamic RAM (DRDRAM), and a memory bus dynamic RAM (RDRAM) or the like.

The technical features of the above embodiments may be combined arbitrarily, and in order to make the description concise, not all possible combinations of the technical features in the above embodiments are described; however, combinations of these technical features should be considered as within the scope recorded in this specification as long as there is no contradiction between these combinations.

The above embodiments only express several implementations of the present invention, and the description of these embodiments is specific and detailed, but these embodiments cannot be construed as limitations to the scope of the patent of the present invention. It shall be noted that, several variations and improvements can be made by those of ordinary skill in the art without departing from the concept of the present invention, and all these variations and improvements are within the scope claimed in the present invention. Therefore, the scope claimed in the patent of the present invention should be governed by the appended claims.

The invention claimed is:
1. A method for generating a stop-motion animation, comprising:
S101: acquiring a video containing a periodic motion of a target, the video containing a preset number of continuous motion periods;
S102: determining an initial motion period of the target in the video by using a posture estimation algorithm;
S103: determining a start period node according to the initial motion period, determining subsequent period nodes according to the start period node, and for the preset number of continuous motion periods, respectively extracting, in each motion period, a video frame corresponding to the same posture, or respectively extracting, in each motion period, a video frame corresponding to a different posture in a sequential order or reversed sequential order of motion, so as to obtain a video frame sequence of the stop-motion animation; and
S104: generating a stop-motion animation video according to the video frame sequence of the stop-motion animation,
wherein the S102 specifically comprises:
S1021: extracting a preset number of continuous video frames from the video:
S1022: for the preset number of continuous video frames, identifying key points of the target periodically moving in each of the video frames by using the target identi- fication and tracking algorithm, and each of the key points is represented by coordinate values;

S1023: according to the key points of the target in the preset number of continuous video frames, calculating an observation value V(i) of two preset key points in each of the video frames to obtain an observation value sequence of the video, wherein the observation value is the distance between the two preset key points of the target in the video frame;

S1024: performing discrete Fourier transform on the observation value sequence to find the frequency F with the largest response, then the period of an initial observation value is N/F, wherein N is the number of the preset number of continuous video frames; and S1025: obtaining an initial motion period M(0) according to the period of the initial observation value.

2. The method according to claim 1, wherein the video is shot from a fixed perspective.

3. The method according to claim 1, wherein after the S101, the method further comprises:

S1012: identifying and tracking the target from a start point by adopting a target identification and tracking algorithm, and performing perspective transformation operation on the target in the video frame to keep the target in the same position in each video frame, and/or keep the target in the same size in each video frame.

4. The method according to claim 3, wherein after the S101 or before the S1012, the method further comprises:

manually or automatically selecting one video frame after the target starts the periodic motion in the video as the start point for performing S102 or S1012.

5. The method according to claim 1, wherein the step of for the preset number of continuous motion periods, respectively extracting, in each motion period, a video frame corresponding to the same posture so as to obtain a video frame sequence of the stop-motion animation, specifically comprises:

S10311: among the video frames from the beginning of a first initial motion period to the end of a second initial motion period, selecting the video frame with the largest observation value to serve as a start video frame k(0) of the initial motion period and as the start motion period node k(0);

S10312: outputting a first frame of the video frame sequence of the stop-motion animation as k(0)+β*M(0), according to the start video frame k(0); wherein β is the position of an expected output posture among all postures in the whole initial motion period M(0), the value of β is in the interval of [0,1], 0 represents a first posture in the whole motion period, and 1 represents the last posture in the whole motion period;

S10313: among the video frames within the range of two continuous initial motion periods after the previous period node k(i−1), selecting a video frame with the largest observation value as the next motion period node k(i), wherein i is a positive integer;

S10314: calculating the ith motion period M(i), according to the next period node k(i); and S10315: selecting and outputting the k(i)+B*M(i)th frame to the video frame sequence of the stop-motion animation.

6. The method according to claim 1, wherein the step of for the preset number of continuous motion periods, respectively extracting, in different motion periods, a video frame corresponding to a different posture in a sequential order or reversed sequential order of motion so as to obtain a video frame sequence of the stop-motion animation, specifically comprises:

S10321: among the video frames from the beginning of the first initial motion period to the end of the second initial motion period, selecting the video frame with the largest observation value to serve as the start video frame k(0) of the initial motion period and as the start period node k(0);

S10322: outputting the first frame of the video frame sequence of the stop-motion animation as k(0)+β(0)*M(0) according to the start video frame k(0), wherein β(0) is the position of an initial output posture among all the postures in the whole initial motion period M(0), the value of β(0) is in the interval of [0,1], 0 represents the first posture in the whole motion period, and 1 represents the last posture in the whole motion period;

S10323: among the video frames within the range of two continuous initial motion periods after the previous period node k(i−1), selecting the video frame with the largest observation value to serve as the next motion period node k(i), wherein i is a positive integer;

S10324: calculating the ith motion period M(i), according to the next period node k(i); and S10325: selecting and outputting the M(i)=k(i)−k(i−1)th frame to the video frame sequence of the stop-motion animation, wherein when the periodic motion of the target is forward, β(i)=β(i−1)+1/M(i); if β(i)>1, then β(i)=β(i)−1; when the periodic motion of the target is backward, β(i)=β(i−1)−1/M(i); if β(i)<0, then β(i)=β(i)+1.

7. The method according to claim 5, wherein the video frames from the beginning of the first initial motion period to the end of the second initial motion period are specifically video frames from the 1/2 th initial motion period M(0) to the 3/2 th initial motion period M(0); the video frames within the range of two continuous initial motion periods are specifically video frames between the 3/4 th initial motion period M(0) to the 5/4th initial motion period M(0).

8. The method according to claim 5, wherein the step of calculating the ith motion period M(i), according to the next period node k(i) specifically as follow:

the ith motion period M(i) is calculated according to follow equation:

$$M(i) = k(i) - k(i-1)$$

or, the ith motion period M(i) is calculated according to follow equation:

$$M(i) = M(i)' * x + M(i-1) * (1-x)$$

wherein M(i)'=k(i)'−k(i−1), k(i)'=k(i), 1>x>0, and x represents the speed of change of length for two adjacent motion periods;

the next period node k(i) is recalculated as k(i)=k(i−1)+M(i), according to the obtained ith motion period M(i).

9. The method according to claim 1, wherein the S104 specifically comprises:

according to the sequence in which the video frames occur in the video among the video frame sequence of the stop-motion animation, sorting the video frames according to a preset rule, and playing the video frames in turn to generate the stop-motion animation video.

10. The method according to claim 6, wherein
the video frames from the beginning of the first initial motion period to the end of the second initial motion period are specifically video frames from the 1/2 th initial motion period M(0) to the 3/2 th initial motion period M(0);
the video frames within the range of two continuous initial motion periods are specifically video frames between the 3/4 th initial motion period M(0) to the 5/4 th initial motion period M(0).

11. The method according to claim 6, wherein the step of calculating the ith motion period M(i), according to the next period node k(i) specifically as follow:
the ith motion period M(i) is calculated according to follow equation:

$$M(i) = k(i) - k(i-1)$$

or,
the ith motion period M(i) is calculated according to follow equation:

$$M(i) = M(i)' * x + M(i-1) * (1-x)$$

wherein M(i)'=k(i)'−k(i−1), k(i)'=k(i), 1>x>0, and x represents the speed of change of length for two adjacent motion periods;
the next period node k(i) is recalculated as k(i)=k(i−1)+ M(i), according to the obtained ith motion period M(i).

12. A non-transitory computer readable storage medium storing a computer program, wherein the computer program, when executed by a processor, implements steps of a method for generating a stop-motion animation,
wherein the method for generating the stop-motion animation comprises:
S101: acquiring a video containing a periodic motion of a target, the video containing a preset number of continuous motion periods;
S102: determining an initial motion period of the target in the video by using a posture estimation algorithm;
S103: determining a start period node according to the initial motion period, determining subsequent period nodes according to the start period node, and for the preset number of continuous motion periods, respectively extracting, in each motion period, a video frame corresponding to the same posture, or respectively extracting, in each motion period, a video frame corresponding to a different posture in a sequential order or reversed sequential order of motion, so as to obtain a video frame sequence of the stop-motion animation; and
S104: generating a stop-motion animation video according to the video frame sequence of the stop-motion animation,
wherein the S102 specifically comprises:
S1021: extracting a preset number of continuous video frames from the video;
S1022: for the preset number of continuous video frames, identifying key points of the target periodically moving in each of the video frames by using the target identification and tracking algorithm, and each of the key points is represented by coordinate values;
S1023: according to the key points of the target in the preset number of continuous video frames, calculating an observation value V(i) of two preset key points in each of the video frames to obtain an observation value sequence of the video, wherein the observation value is the distance between the two preset key points of the target in the video frame;
S1024: performing discrete Fourier transform on the observation value sequence to find the frequency F with the largest response, then the period of an initial observation value is N/F, wherein N is the number of the preset number of continuous video frames; and
S1025: obtaining an initial motion period M(0) according to the period of the initial observation value.

13. A computer device, comprising:
one or more processors;
a memory; and
one or more computer programs, the processors and the memory being connected through a bus, wherein the one or more computer programs are stored in the memory and are configured to be executed by the one or more processors, being characterized in that, the one or more processors, when executing the computer programs, implement steps of a method for generating a stop-motion animation,
wherein the method for generating the stop-motion animation comprises:
S101: acquiring a video containing a periodic motion of a target, the video containing a preset number of continuous motion periods;
S102: determining an initial motion period of the target in the video by using a posture estimation algorithm;
S103: determining a start period node according to the initial motion period, determining subsequent period nodes according to the start period node, and for the preset number of continuous motion periods, respectively extracting, in each motion period, a video frame corresponding to the same posture, or respectively extracting, in each motion period, a video frame corresponding to a different posture in a sequential order or reversed sequential order of motion, so as to obtain a video frame sequence of the stop-motion animation; and
S104: generating a stop-motion animation video according to the video frame sequence of the stop-motion animation,
wherein the S102 specifically comprises:
S1021: extracting a preset number of continuous video frames from the video;
S1022: for the preset number of continuous video frames, identifying key points of the target periodically moving in each of the video frames by using the target identification and tracking algorithm, and each of the key points is represented by coordinate values;
S1023: according to the key points of the target in the preset number of continuous video frames, calculating an observation value V(i) of two preset key points in each of the video frames to obtain an observation value sequence of the video, wherein the observation value is the distance between the two preset key points of the target in the video frame;
S1024: performing discrete Fourier transform on the observation value sequence to find the frequency F with the largest response, then the period of an initial observation value is N/F wherein N is the number of the preset number of continuous video frames; and S1025: obtaining an initial motion period M(0) according to the period of the initial observation value.

14. The computer device according to claim 13, wherein the video is shot from a fixed perspective.

15. The computer device according to claim 13, wherein after the S101, the method further comprises:

S1012: identifying and tracking the target from a start point by adopting a target identification and tracking algorithm, and performing perspective transformation operation on the target in the video frame to keep the target in the same position in each video frame, and/or keep the target in the same size in each video frame.

16. The computer device according to claim 15, wherein after the S101 or before the S1012, the method further comprises:

manually or automatically selecting one video frame after the target starts the periodic motion in the video as the start point for performing S102 or S1012.

* * * * *